United States Patent [19]

Province

[11] 3,887,983

[45] June 10, 1975

[54] PIPE PULLING TOOL

[75] Inventor: William F. Province, Bartlesville, Okla.

[73] Assignee: The Ridge Tool Company, Bartlesville, Okla.

[22] Filed: Aug. 5, 1974

[21] Appl. No.: 495,060

Related U.S. Application Data

[63] Continuation of Ser. No. 318,002, Dec. 26, 1972, abandoned.

[52] U.S. Cl. .................. 29/234; 29/235

[51] Int. Cl. .................. B23p 19/04

[58] Field of Search...... 29/234, 235; 254/134.3 FT; 294/81 R, 82 R, 131; 138/9, 178

[56] References Cited

UNITED STATES PATENTS

| | | | |
|---|---|---|---|
| 892,287 | 6/1908 | Morse | 29/235 |
| 1,148,495 | 8/1915 | Birdseye | 294/131 |
| 2,215,049 | 9/1940 | Minor | 294/82 |
| 2,997,738 | 8/1961 | Soderquist | 29/235 |

*Primary Examiner*—James L. Jones, Jr.

[57] ABSTRACT

This disclosure describes a system for pulling a plastic liner pipe inside of an existing conduit. It comprises a fixture which can be attached to one end of the liner pipe and to which can be attached a tensile member to pull the fixture and the attached liner pipe into the existing conduit. The fixture comprises a circular disc of smaller diameter than the liner pipe with a plurality of radial strips which are bent to an angle of something less than 90° so that the strips conform to an outwardly tapering surface. A template is provided to be placed around the end of the liner pipe so that a plurality of triangular segments can be cut out of the pipe wall leaving an equal plurality of tapering fingers remaining. These fingers are bent inwardly providing a tapering surface which matches the taper of the strips of the fixture. The strips of the fixture are fastened individually to each of the tapering fingers on the liner pipe. Means are provided to attach a tension member to the circular disc.

9 Claims, 3 Drawing Figures

12 16 26 11 24 26 30 2 10 36 34 26 24 30 20' 18 24 26 22 32 36 2

24
18
20'
24
18
38
22
38

14
18
18
20
20
28

34
30
10
36
32
36
2
2
22
18
20'
26
24
24
11
24
24
26
26
30
26
26
16
12

PIPE PULLING TOOL

This is a continuation of application Ser. No. 318,002, filed Dec. 26, 1972, now abandoned.

BACKGROUND OF THE INVENTION

This invention lies in the field of pipes and conduits. "Conduit" as used herein refers to any pipe for conducting fluid or gases, such as storm sewer conduits, sanitary sewer conduits, water mains, pipelines, or any other type of conduit or pipe of concrete, metal or plastic. More particularly it concerns apparatus for lining existing conduits with plastic liner pipes.

There is need for providing plastic liner pipes inside of old existing conduits which have been cracked or perforated or have leaks from one cause or another. The liner pipe serves to seal the fluid or gas content of the conduit where the existing conduit provides the external support, such as against the fluid pressure inside of the liner pipe. It is important that the liner pipe be of diameter only slightly less than that of the inside of the conduit so that it can receive tensile support from the conduit. However, it is difficult to draw into a conduit another semi-rigid pipe of almost the same diameter. It is important, therefore, that the liner pipe be of such thickness that it will be reasonably deformable so as to pass over obstructions on the wall of the existing conduit. Furthermore, because of the large size of the liner pipe compared to the internal diameter of the conduit it is important that the fixture for attachment to the liner pipe be able to maneuver freely in the inside of the conduit.

In the prior art, the pulling attachments are typically of a diameter equal to the liner pipe and are inflexible and are thus difficult to pull through the conduit.

SUMMARY OF THE INVENTION

It is a primary object of this invention to provide a pulling fixture which can be attached to a liner pipe which is flexible enough to adjust its contour so as to pass obstacles or obstructions inside of the conduit.

This and other objects are realized and the limitations of the prior art are overcome in this invention by making the pulling fixture a circular disc to which is attached a plurality of radial fingers or strips which are bent at an angle of less than 90° to the plane of the disc, and conform to an outwardly tapering surface. The liner pipe, by the use of a template, is marked and cut to remove a plurality of triangular segments, spaced circumferentially around one end of the liner pipe. The remaining tapering fingers of the pipe surface are bent inwardly to form a conical surface to match that of the plurality of fingers. Rotatable bail means are provided for attachment of a pulling member, such as a cable, to the central disc in order to pull the fixture and the attached liner pipe into a conduit.

The use of the plurality of strips and of narrow fingers and the limitations on the diameter of the fixture itself provide a flexibility that permits the pulling end of the liner pipe to deflect and deform in order to pass deformed sections of the conduit, or obstructions on the walls of the conduit.

BRIEF DESCRIPTION OF THE DRAWINGS

These and other objects of this invention and a better understanding of the principles and details of the invention will be evident from the following description taken in conjunction with the appended drawings in which.

DESCRIPTION OF THE PREFERRED EMBODIMENT

Figure 2:
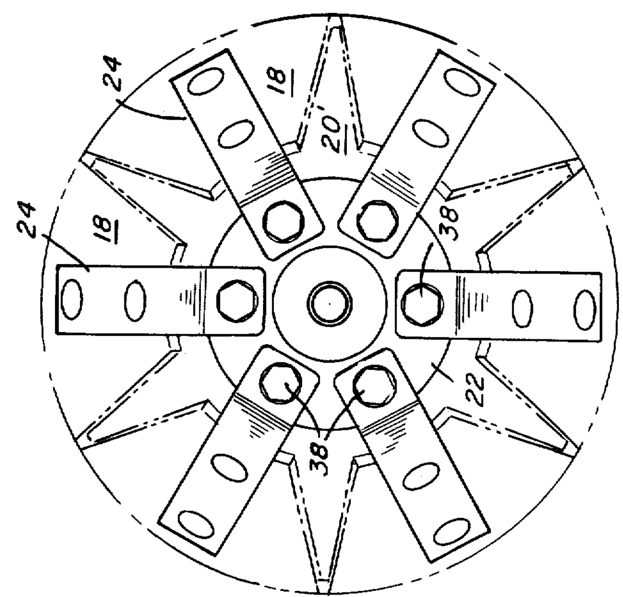
FIG. 2 shows an end view of the pulling attachment and the liner pipe.
Figure 3:
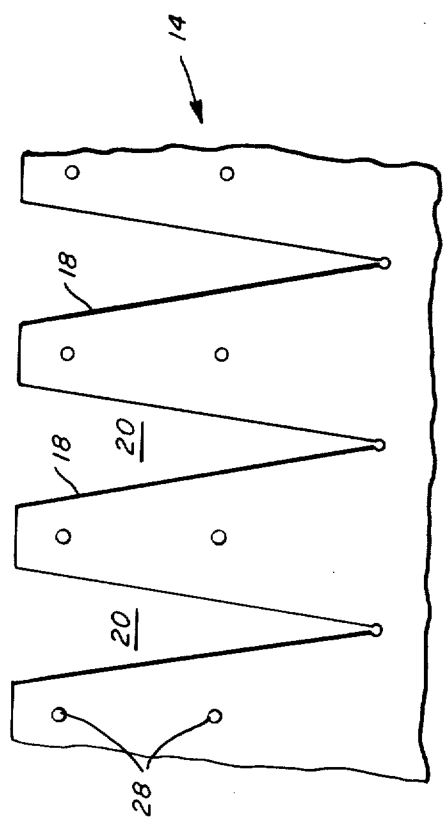
FIG. 3 shows a view of the cutting template.

Referring now to the drawings, the pulling attachment is indicated generally by the numeral 10. One end of the liner pipe is indicated by dashed line 12. The triangular segments 20 are cut from the wall of the pipe leaving a plurality of tapering fingers 18 which are bent inwardly to provide a tapering surface generally indicated by the numeral 11.

The pulling fixture comprises a central plate 22 of diameter smaller than the conduit (not shown) into which the liner pipe is to be pulled. The central plate carries a plurality of radial straps 24 spaced circumferentially, which are bent out of the plane of the plate by an angle of less than 90°, so as to form an expanding conical surface which is adapted to match the conical surface 11 composed of the fingers 18 of the liner pipe 12. The radial straps 24 are fastened to the fingers 18 by means of bolts 26 and nuts 30 as indicated.

The straps 24 can be separate straps which are fastened at one end of the plate 22 by means of bolts 38 or they can be a disc of metal from which a plurality of sectors have been cut out to leave the plurality of radial fingers or straps.

The radial straps which are fastened to the plate 22 are bent toward the axis of the liner pipe so that they form a conical surface expanding toward their outer ends. The diameter of the ends of the straps is less than the diameter of the liner pipe, and therefore less than the inner diameter of the conduit into which the liner pipe is to be pulled. Thus they are not only flexible enough to bypass obstacles, but are themselves of a diameter sufficient to freely pass small obstacles on the wall of the conduit.

Figure 1:
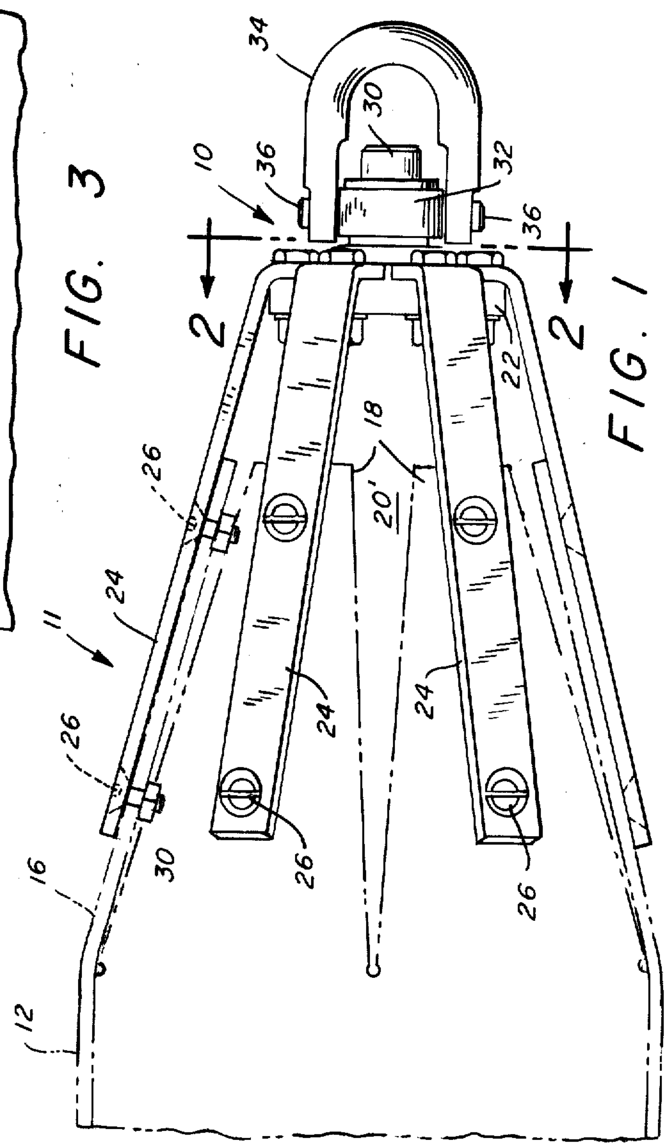
FIG. 1 shows a side view of the pulling attachment which is attached to an end of the liner pipe.

Shown in FIG. 1 is an axial post 30 fastened to the center of the plate 22. On this is clamped a rotatable part 32 which has two stub shafts 36, diametrically opposed to each other, on which is supported a loop or bail 34. The tension member, or cable, (not shown) that is used to pull the liner pipe 12 into a conduit is attached to bail 34.

While the invention has been described with a certain degree of particularity it is manifest that many changes may be made in the details of construction and the arrangement of components. It is understood that the invention is not to be limited to the specific embodiments set forth herein by way of exemplifying the invention but the invention is to be limited only by the scope of the attached claim or claims, including the full range of equivalency to which each element or step thereof is entitled.

What is claimed is:

1. The combination of a liner pipe and a liner pipe pulling means, comprising:

a. a liner pipe, one end of said liner pipe having a plurality of fingers extending from the end of the pipe and spaced circumferentially around said pipe, said fingers bent inwardly to form generally a truncated conical surface;

b. said pulling means comprising: axial support means; a plurality of circumferentially spaced straps attached to said axial support means; said straps expanding outwardly from the axis to form generally a conical surface;

c. means to removably attach each of said straps individually to one of said fingers; and d. means to attach a tensile means to said axial support means.

2. The combination as in claim 1 in which the number of fingers is equal to the number of straps.

3. The combination as in claim 1 in which said means to attach tensile means to said support means includes swivel means.

4. The combination as in claim 1 in which said axial support means comprises central plate means, said straps fastened rigidly to said plate means.

5. The combination as in claim 1 including an axial opening in said plate means, an axial post rotatably received in said opening and bale means affixed to said post.

6. The combination as in claim 1 in which said straps and said fingers are rigidly attached by removable means.

7. The combination as in claim 6 in which said removable means comprises threaded means.

8. The combination as in claim 1 in which said plurality of fingers comprise extensions of said liner pipe after a plurality of spaced triangular segments are removed from the end of said pipe.

9. The combination as in claim 1 in which said conical surface has substantially the same solid angle as said truncated surface.

* * * * *